(12) United States Patent
Hwang et al.

(10) Patent No.: US 8,707,151 B2
(45) Date of Patent: Apr. 22, 2014

(54) APPARATUS AND METHOD FOR COMPOSING SCENES USING RICH MEDIA CONTENTS

(75) Inventors: Seo-Young Hwang, Suwon-si (KR); Jae-Yeon Song, Seoul (KR); Kook-Heui Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1145 days.

(21) Appl. No.: 12/427,306

(22) Filed: Apr. 21, 2009

(65) Prior Publication Data

US 2009/0265603 A1 Oct. 22, 2009

(30) Foreign Application Priority Data

| Apr. 21, 2008 | (KR) | ........................ 10-2008-0036891 |
| Apr. 30, 2008 | (KR) | ........................ 10-2008-0040315 |
| Aug. 25, 2008 | (KR) | ........................ 10-2008-0083007 |
| Oct. 10, 2008 | (KR) | ........................ 10-2008-0099765 |

(51) Int. Cl.
*G06F 17/00* (2006.01)

(52) U.S. Cl.
USPC ........... 715/201; 715/273; 345/473; 345/474; 345/475; 709/206

(58) Field of Classification Search
USPC .................................. 715/201; 345/474, 475
See application file for complete search history.

(56) References Cited

U.S. PATENT DOCUMENTS

| 5,734,589 | A  | * | 3/1998  | Kostreski et al. ............. 715/716 |
| 5,742,361 | A  | * | 4/1998  | Nakase et al. ........... 375/240.26 |
| 6,317,131 | B2 | * | 11/2001 | Basso et al. .................... 345/474 |
| 6,618,438 | B1 | * | 9/2003  | Le Roux et al. ......... 375/240.12 |
| 6,751,623 | B1 | * | 6/2004  | Basso et al. ............................ 1/1 |
| 6,848,004 | B1 | * | 1/2005  | Chang et al. ................... 709/232 |
| 8,095,919 | B2 | * | 1/2012  | Harris et al. ................... 717/136 |
| 8,199,781 | B2 | * | 6/2012  | Seo et al. ....................... 370/535 |
| 2002/0031188 | A1 |  | 3/2002 | Negishi et al. |
| 2002/0114397 | A1 | * | 8/2002 | Todo et al. ............... 375/240.29 |
| 2004/0139212 | A1 | * | 7/2004 | Mukherjee et al. ........... 709/230 |
| 2005/0120038 | A1 | * | 6/2005 | Jebb et al. ...................... 707/102 |
| 2005/0144233 | A1 | * | 6/2005 | Kjesbu et al. ................. 709/204 |
| 2005/0165846 | A1 | * | 7/2005 | Tsujii et al. ................ 707/104.1 |
| 2005/0207657 | A1 | * | 9/2005 | Clark ............................. 382/232 |

(Continued)

FOREIGN PATENT DOCUMENTS

| JP | 2002-064802 | 2/2002 |
| JP | 2004-013823 | 1/2004 |

(Continued)

OTHER PUBLICATIONS

Dufourd et al., "LASeR and SAF Editor's Study", XP-002394535, Jul. 2005, pp. 1-72.*

(Continued)

*Primary Examiner* — Stephen Hong
*Assistant Examiner* — Mario M Velez-Lopez
(74) *Attorney, Agent, or Firm* — The Farrell Law Firm, P.C.

(57) ABSTRACT

A user interface method and apparatus for a Rich Media service in a terminal. A decoder decodes a received stream to check a header of the received stream. A renderer adaptively composes a scene using scene composition elements of the received stream, according to adaptation information in the header checked by the decoder, and a display displays the adaptively composed scene.

19 Claims, 6 Drawing Sheets

(56) References Cited

U.S. PATENT DOCUMENTS

| | | |
|---|---|---|
| 2005/0226196 A1 | 10/2005 | Suh |
| 2006/0112167 A1* | 5/2006 | Steele et al. .................. 709/206 |
| 2008/0178072 A1* | 7/2008 | Fiedorowicz et al. ........ 715/235 |
| 2009/0003389 A1 | 1/2009 | Joung et al. |
| 2009/0167769 A1 | 7/2009 | Gouesbet et al. |
| 2009/0265603 A1* | 10/2009 | Hwang et al. .................. 715/201 |
| 2010/0142557 A1* | 6/2010 | Priddle et al. .................. 370/474 |
| 2010/0316361 A1* | 12/2010 | Jeon et al. ..................... 386/355 |

FOREIGN PATENT DOCUMENTS

| | | |
|---|---|---|
| JP | 2008-507888 | 3/2008 |
| KR | 1020060091549 | 8/2006 |
| WO | WO 2005/039131 | 4/2005 |
| WO | WO 2007/000649 | 1/2007 |
| WO | WO 2007/028137 | 3/2007 |
| WO | WO 2007/107534 | 9/2007 |

OTHER PUBLICATIONS

Dufourd et al.: "LASeR and SAF Editor's Study", XP-002394535, Jul. 2005.

Dufourd et al.: "An MPEG Standard for Rich Media Services", IEEE Multimedia, XP-002412761, Oct. 1, 2005.

Schmitz: "The SMIL 2.0 Timing and Synchronization Model", Technical Report, XP-002376474, Jan. 2, 2001.

* cited by examiner

APPARATUS AND METHOD FOR COMPOSING SCENES USING RICH MEDIA CONTENTS

PRIORITY

This application claims priority under 35 U.S.C. §119(a) to Korean Patent Applications filed in the Korean Intellectual Property Office on Apr. 21, 2008 and assigned Serial No. 10-2008-0036891, on Apr. 30, 2008 and assigned Serial No. 10-2008-0040315, on Aug. 25, 2008 and assigned Serial No. 10-2008-0083007, and on Oct. 10, 2008 and assigned Serial No. 10-2008-0099765, the entire disclosures of which are incorporated herein by reference.

BACKGROUND OF THE INVENTION

1. Field of the Invention

The present invention relates generally to content composition technology for a terminal supporting Rich Media Service. More particularly, the present invention relates to an apparatus and method for adaptively composing a scene using Rich Media Service contents.

2. Description of the Related Art

Communication markets are continuously required to produce new services through recombination and/or integration of the existing technologies. In this regard, today, the communication and broadcasting technologies are developing to offer a Rich Media Service through broadcast terminals such as TV and also communication devices (hereinafter referred to as "terminals").

Lightweight Application Scene Representation (LASeR) has been adopted as an international standard for providing the Rich Media Service. LASeR may provide services that enable free representations of various multimedia and interactions with users, using a variety of elements such as scene description, video, audio, images, fonts, and metadata. In addition, LASeR technology can multiplex and synchronize Elementary Streams (ESs) of various media and minimize its complexity using a Simple Aggregation Format (SAF).

Along the recent trend of the communication technologies, a network model is possible in which different types of terminals are connected over a single network, e.g., with the convergence of networks, such as Digital Video Broadcasting-Convergence of Broadcasting and Mobile Service (DVB-CBMS) or Internet Protocol TV (IPTV). In a service model in which a single integration service provider manages a network formed by wire/wireless convergence, the same service can be provided to terminals regardless of their types. In this business model, particularly in a broadcast service model, a single broadcast stream is simultaneously transmitted to terminals having different display sizes, performances, and characteristics. Therefore, when the same Rich Media service is provided to multiple terminals having different characteristics. Consequently, when receiving the broadcast contents, the same LASeR contents are provided to the terminals, which range from a terminal with a large screen (e.g., TV) to a terminal with a small screen (e.g., mobile phone).

However, a terminal with a small screen, which has received a scene optimized for a large screen size such as TV, may have difficulties in securing available resources for a broadcast service contents and should compose a scene, which is excessively complex compared with that for an actual screen size of the terminal, for example.

SUMMARY OF THE INVENTION

The present invention has been designed to address at least the above-mentioned problems and/or disadvantages and to provide at least the advantages described below. Accordingly, an aspect of the present invention is to provide an apparatus and method for composing a scene for multi-media service.

Another aspect of the present invention is to provide an apparatus and method for composing an adaptive scene using multi-media service contents.

Another aspect of the present invention is to provide an apparatus and method for adaptively composing scenes by filtering single multi-media service content.

Another aspect of the present invention is to provide an apparatus and method for adaptively composing scenes using Rich Media (e.g., LASeR) contents.

Another aspect of the present invention is to provide an apparatus and method for composing a LASeR scene taking into account specific conditions or performances of a receiving terminal.

In accordance with an aspect of the present invention, there is provided a user interface method of a terminal for a Rich Media Service. The user interface method includes checking a header of a received stream; composing an adaptive scene using scene composition elements of the received stream, when adaptation information is included in the header; and displaying the composed adaptive scene.

In accordance with another aspect of the present invention, there is provided a user interface apparatus of a terminal for a Rich Media service. The user interface apparatus includes a decoder for decoding a received stream to check a header of the received stream; a renderer for adaptively composing a scene using scene composition elements of the received stream, according to adaptation information in the header checked by the decoder; and a display for displaying the composed scene.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE PRESENT INVENTION

The following description, with reference to the accompanying drawings, is provided to assist in a comprehensive understanding of certain embodiments of the present invention. Accordingly, it includes various specific details to assist in that understanding. However, these specific details are to be regarded as merely exemplary. Further, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are used by the inventor to enable a clear and consistent understanding of the invention. It should be apparent to those skilled in the art that the following description of embodiments of the present invention are provided for illustration purpose only and not for the purpose of limiting the present invention as will be defined by the appended claims and their equivalents.

In the following description, a terminal based on a LASeR engine, which is a type of Rich Media Engine (RME), is given as an example. Meanwhile, an example of the terminal based on the LASeR engine can be equally applied to terminals based on other RME engines. However, when there is a change in the RME or the system that is applied to the terminal, the names of components constituting its engine, system and data will likely use different names that are uniquely used in the other RME engines or systems.

An embodiment of the present invention provides a method and apparatus for transmitting and receiving LASeR contents that are suitable for specific conditions or performances of a terminal in LASeR service. The term "terminal" as used herein may include a portable communication device and a wire/wireless communication device, including phone (including mobile phone, wireless phone, wire phone), Personal Digital Assistant (PDA), laptop, notebook computer, etc.

In particular, certain embodiments of the present invention provide a scene representation and composition technology for a terminal that receive LASeR service, and further provides a method and apparatus for offering LASeR contents according to specific conditions or attributes associated with the characteristics (features) of the terminal, to occurrence of specific events, and to performances of the terminal, in providing adaptive scenes for the service.

Figure 1:
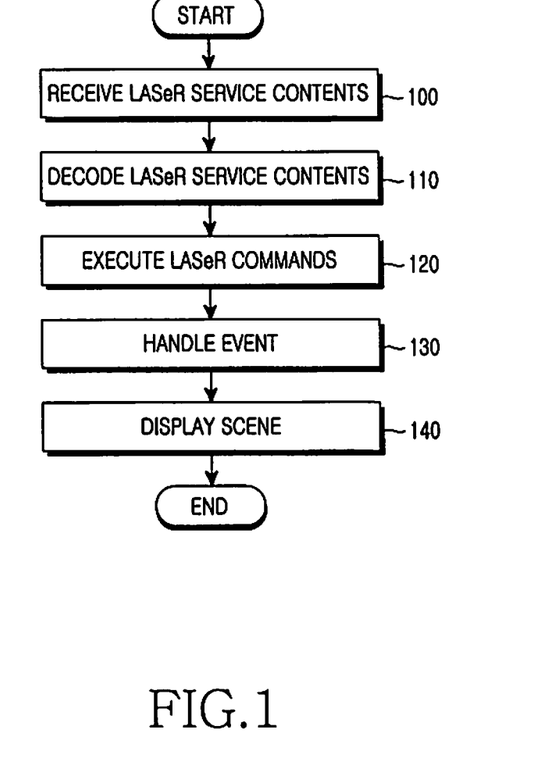
FIG. 1 illustrates an operation of a terminal for receiving a LASeR data stream.

FIG. 1 illustrates an operation of a terminal for receiving LASeR contents.

Referring to FIG. 1, a terminal receives LASeR service contents in step 100, and decodes the received LASeR contents in step 110. In step 120, the terminal checks the LASeR commands and executes the commands accordingly. Thereafter, the terminal handles all events based on the LASeR contents in step 130, and displays a scene by executing a scene composition command in step 140.

Herein, a data stream may include complex scene composition elements in addition to basic elements necessary for providing LASeR services, or may include scene composition elements suitable for the high-end terminal (communication device), or data added to basic scenes. In addition, a LASeR data stream described herein includes a data stream that contains components regarding characteristics of each terminal. The characteristics may include features and performances of terminals that receive the data stream.

Figure 2:
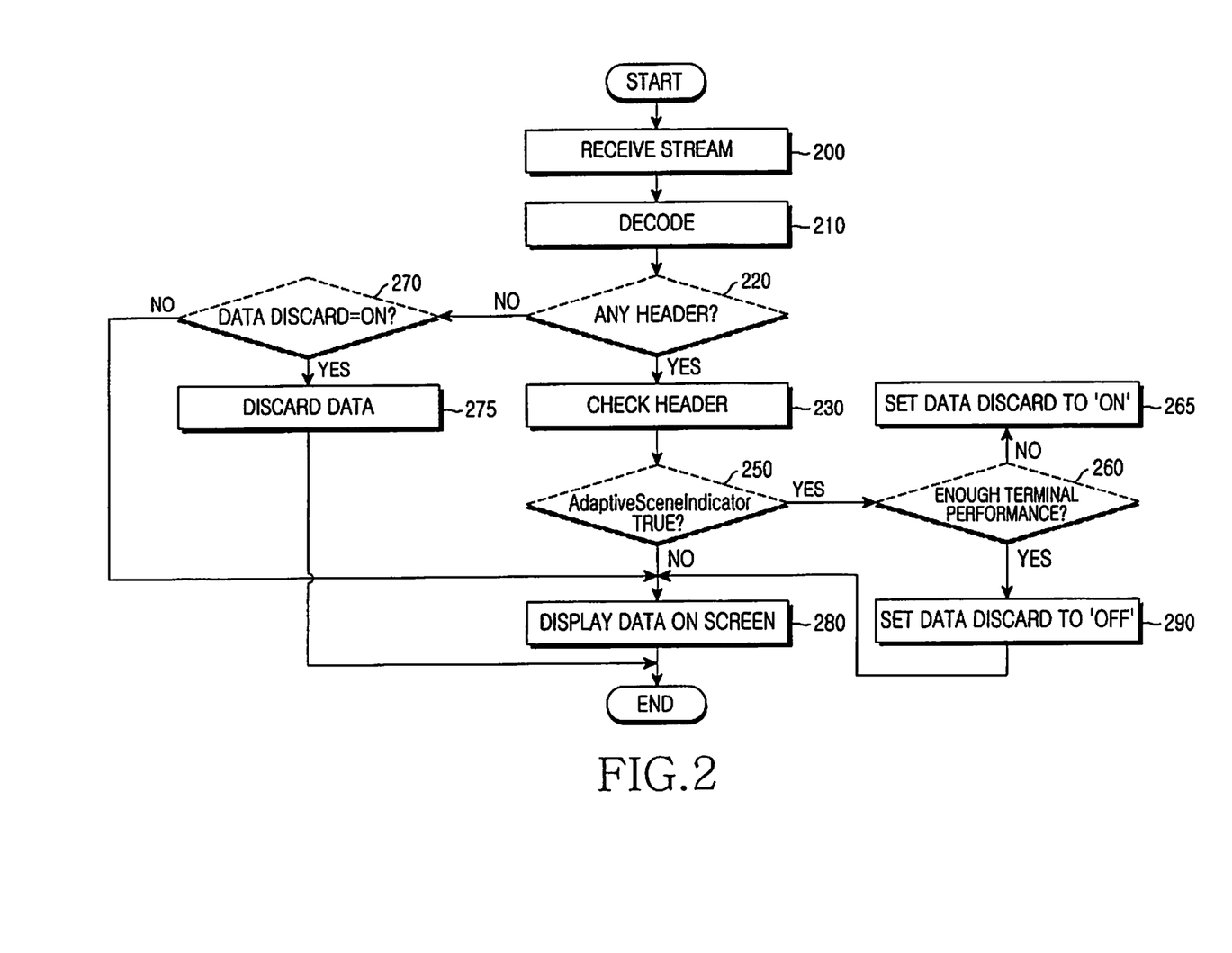
FIG. 2 illustrates an operation of a terminal for receiving a LASeR data stream according to an embodiment of the present invention.

FIG. 2 illustrates an operation of a terminal for receiving LASeR contents according to an embodiment of the present invention. More specifically, FIG. 2 illustrates an operation of a terminal for composing a scene, when a LASeR data stream includes scene composition data for a terminal having rich available resources or includes scene composition data adaptable to performance of a terminal, i.e., when the LASeR data stream includes information indicating "adaptive scene component".

Referring to FIG. 2, a terminal receives a LASeR stream in step 200, and decodes the received LASeR stream in step 210. In step 220, the terminal determines if the decoded LASeR stream includes a header. If the LASeR stream includes a header, the terminal checks the header information in step 230. If information indicating "adaptive scene component", i.e., a value of an "AdaptiveSceneIndicator" field, is FALSE in the checked header information in step 250, the terminal displays the received data stream on its screen in step 280. However, if a value of the checked "AdaptiveSceneIndicator" field is TRUE, the terminal checks its performance in step 260.

In step 260, if the performance is not sufficient enough to service an "adaptive scene component", the terminal sets setting information for Data Discard to ON to discard the received LASeR stream in step 265. By discarding the LASeR stream to be decoded without decoding, the terminal avoids displaying the data stream on the screen. Even if the LASeR stream to be discarded has already been decoded, the terminal can perform a discard process by immediately deleting data from a memory.

However, if the performance is sufficient enough to service an "adaptive scene component" in step 260, in step 290, the terminal sets setting information for Data Discard to OFF so as not to discard the LASeR stream. Thereafter, in step 280, the terminal provides the LASeR service by displaying the data stream on the screen. The actual display process of step 280, although not described in detail herein, may include further technical steps for servicing the contents to be serviced without being discarded.

Further, if the decoded LASeR stream has no header in step 220, the terminal checks the setting information for Data Discard in the LASeR stream in step 270. If the setting information for Data Discard is set to ON, the terminal discards in step 275 the LASeR stream without further processing, i.e., without composing or rendering it in a memory. However, if the setting information for Data Discard is set to OFF, the terminal displays the LASeR stream on the screen in step 280.

In the above described embodiment, except for receiving a stream (step 200), decoding the received stream (step 210), and displaying the received stream on the screen (step 280) referring to a value of the "AdaptiveSceneIndicator" field (step 250), and for a series of processes for avoiding handling the stream until data with the "AdaptiveSceneIndicator" field is received, by referring to a value of the "AdaptiveSceneIndicator" field (step 250), all other processes may be changed in the sequence or omitted according to type or design of the terminals.

In addition, if the same service as that of the invention can be provided using the "AdaptiveSceneIndicator" field or other fields and attributes newly defined in the present invention, it would be apparent to those skilled in the art that various changes and modifications of the embodiments described herein can be made without departing from the scope and spirit of the invention.

A detailed description will now be made of information in a LASeR header, which indicates that the received LASeR stream is an "Adaptive scene component".

In the following description, LASeR is given by way of example, and the new fields and attributes used to indicate "Adaptive scene component" may also be used as fields and attributes of data, including not only data of a header type but also commands, elements, fields, units, and payloads.

The "AdaptiveSceneIndicator" field may be expressed in various ways, for example, expressed in Boolean algebra, in integer such as 1, 2, 3 and 4, or in a symbolic level such as basic and enhanced. However, when the "AdaptiveSceneIndicator" field is expressed in a value other than the Boolean algebra, a specific value of its attribute should necessarily be able to be expressed to distinguish "Adaptive scene component".

For example, when an attribute of the "AdaptiveSceneIndicator" field is expressed as an integer, 0 may indicate that the data is for an adaptive service. That is, if an attribute of the field in the received LASeR header is 0, which means AdaptiveSceneIndicator=False, the received data must be displayed on the screen.

Adaptive data including the fields or attributes described herein may be expressed in various data types available in the Rich Media contents, including integer type, string type, decimal faction type, fixed decimal faction type, unfixed decimal faction type, list type, etc., such as string, Boolean, decimal, precisionDecimal, float, double, duration, dateTime, time, date, gYearMonth, gYear, gMonthDay, gDay, gMonth, hexBinary, base64Binary, anyURI, QName, NOTATION, normalizedString, token, language, NMTOKEN, NMTOKENS, Name, NCName, ID, IDREF, IDREFS, ENTITY, ENTITIES, integer, nonPositiveInteger, negativeInteger, long, int, short, byte, nonNegativeInteger, unsignedLong, unsignedInt, unsignedShort, unsignedByte, positiveInteger, yearMonthDuration, and enumeration. Also, reference can be made to information inside/outside the terminal and service. This may be similarly applied to all embodiments of the present invention.

Table 1 below shows adaptation criteria, i.e. "AdaptationType", of a LASeR data stream adaptable to performance of a terminal.

As the "AdaptationType", various factors associated with specific conditions or a change in the status or situation of a terminal can be used, including resolution required for a terminal to process data, screen size, frequency of use in a service scene, occupation ratio regarding terminal resources consumed for data processing capacity, memory size, power consumption capacity, resource information required with regard to data transmission, performance and structure of a terminal with regard to input/output capacity required to provide the service, etc.

For example, various factors can be further added, including information associated with computational capacity of a terminal and memory-related information of a terminal such as minimum memory size, for example, the number of graphic points, size of or the number of font data, the number of texts, memory capacity required for video processing, terminal's processing capability for video/audio data processing, etc.

Herein, the number of graphic points represents information for indicating the memory capacity or the like needed to create graphic elements, and this information may include information about dots, lines, meshes, polygons, etc., constituting the graphic elements. The necessary information regarding characteristics of each of the graphic elements may be used as "AdaptationType".

The size of or the number of font data is information for indicating information about the memory capacity or the like needed to create data using the fonts. This information may further include the memory capacity needed to create data using a font file, including a size of the font file and information used for loading the font file. This information can also be used as "AdaptationType".

The number of texts represents information for indicating the memory capacity or the like required to create text data. This information may indicate information on a size of the text data, and may further include the memory capacity needed to create the text data. In addition, the information may be used as "AdaptationType".

The memory capacity required for video processing or the processing capability of the terminal for video processing represents information for indicating the memory capacity needed to create picture data such as image or video. When the more memory capacity is needed to create picture data such as image or video, more attributes can be defined to indicate the information, and represented with values including the information.

For example, if a memory for an input video buffer, parameters for decoding, and an output video buffer is needed in processing image/video data files, a memory for the output video buffer and a memory for parameters for decoding image or video data are required for a size of an input video buffer which is greater than a size of the image file, and for the number of bytes needed when 1-pixel data regarding a color format is represented. Therefore, the adaptation criteria include a size of an image file used to check a size of the input video buffer, vertical and horizontal lengths of an image used to check a size of the output video buffer, color format information, codec information, and memory information for parameters for decoding image or video data. Also, this information can be used as "AdaptationType".

In addition, as the adaptation criteria of a terminal, various factors can be used that are associated with performance and service condition of a receiving terminal, including various elements constituting contents, information related to media such as images, fonts, video and audio, input/output capability or device, reaction-related information, etc. In addition, as regards media-related information and texts, graphics, and reaction-related information, information about the data itself, including a size of data, replay time, frame rate (indicating the amount of data that should be processed per second), color table, and update rate, may be used as adaptation criteria. Further, the adaptation criteria may be used depending on externally defined information.

TABLE 1

| Value | Type of adaptation criteria |
|---|---|
| 0x01 | Display Size |
| 0x02 | CPU status |
| 0x03 | Battery status |
| 0x04 | Memory Size |
| 0x05 | Reserved field |
| ~ | ~ |

Table 1 shows adaptation criteria according to an embodiment of the present invention, i.e., each "AdaptationType" may have a criterion.

For example, assuming that the display size becomes an adaptation criterion, if specific scene data or scene segment contains scene information for terminals whose "DisplaySize" is categorized as LARGE, a value of the adaptation criteria is a value that can be represented as "AdaptationTypeValue"=LARGE.

A value of the "AdaptationTypeValue" attribute may be represented in various different ways according to each of the adaptation criteria. That is, if a description method for "AdaptationTypeValue" is different according to each "AdaptationType", each "AdaptationTypeValue" regarding each "AdaptationType" may be defined for its description.

Table 2A below shows an example where information indicating "adaptive scene component" is described using the syntax of a schema. Herein, a schema is used as an example to describe the attributes and elements.

The "schema" as used herein represents a kind of a modeling document in which structure of data is predefined. The schema used herein follows an XML Schema grammar, and may be defined using its elements. In particular, there are various possible methods of defining a structure of attributes and elements. Therefore, it can be appreciated that even the method that does not use the schema may fall within the scope of the present invention, if it has the same meaning.

Values of elements and attributes defined herein by way of example may be described such that the attribute values are limited to one representation method, or may be defined by extending the existing type.

TABLE 2A

```
<xs:complexType name="LASeRHeaderTypeExt">
    <xs:complexContent>
        <xs:extension base=" lsr:LASeRHeaderType ">
            <attribute name="AdaptiveSceneIndicator" type="Boolean" use="optional"/>
            <attribute name="AdaptationType" type="AdaptationTypeType" use="optional" />
            <attributename="AdaptationTypeValue" type="AdaptationValueType" use= >>optional >>/>
        </xs:extension>
    </xs:complexContent>
</xs:complexType>
<element name="LASeRHeader" type="lsr:LASeRHeaderTypeExt"/>
```

Table 2B shows an example where "AdaptationType" and "AdaptationTypeValue" are expressed in one field together.

When the "AdaptationType" and the "AdaptationTypeValue" are expressed in one field together, they can be expressed as, for example, <LASeRHeader . . . AdaptationType_Value="DisplaySize LARGE"/>.

TABLE 2B

```
<xs:complexType name="LASeRHeaderTypeExt">
    <xs:complexContent>
        <xs:extension base=" lsr:LASeRHeaderType ">
            <attribute name="Enhancement" type="Boolean" use="optional"/>
            <attribute name="EnhancementType_Value" use="optional"/>
                <simpleType>
                    <union membertype="AdaptationTypeType AdaptationValueType"/>
                </simpleType>
            </attribute>
        </xs:extension>
    </xs:complexContent>
</xs:complexType>
<element name="LASeRHeader" type="lsr:LASeRHeaderTypeExt"/>
```

In addition, information indicating the "adaptive scene component" can be represented as shown in Table 3A and Table 3B using "AdaptiveSceneIndicator", "AdaptationType", and "AdaptationTypeValue".

TABLE 3A

<LASeRHeader ... AdaptiveSceneIndicator ="True"
AdaptationType="0x01"
AdaptationTypeValue="LARGE" />

Table 3A shows data for terminals whose display sizes are categorized as LARGE (referring to Table 1, '0x01' indicates a display size (viewport size) in criteria of AdaptationType).

Terminals whose display sizes are not categorized as LARGE may filter received data without decoding or rendering it, when they receive data that has the LASeR Header of Table 3A as its header.

Although the display size is set as a symbolic value such as SMALL and LARGE in Table 3A for example, the "AdaptationTypeValue" can be set as any value that represents a display size, including a size physically given in inches (see Table 9), a relative notation and a resolution of a screen.

TABLE 3B

<LASeRHeader ... AdaptiveSceneIndicator ="True"
DisplaySize = "LARGE" />

Table 3B has the same meaning as Table 3A, and represents information that executes the same operation, in a different way. Values that can be used as attribute values of the "AdaptationType" field, e.g. DisplaySize, CPU status, Memory status, and Battery Size, are defined as new attribute fields that replace "AdaptationType", and a value of "AdaptationTypeValue" is defined as a value of its attribute field.

In accordance with one embodiment, "AdaptiveSceneIndicator", "AdaptationType", and "AdaptationTypeValue" can be used independently or collectively.

In the case of "AdaptiveSceneIndicator", although this field is not used, if a field indicating information that indicates "adaptive scene component" described in the present invention is used, it implies that "AdaptiveSceneIndicator"=True.

Because one scene data or scene segment should not necessarily have one adaptation criterion, several adaptation criteria may be used. For example, when several factors such as a scene size of a terminal and a memory size of a terminal are used as adaptation criteria of the scene, data to be filtered may have several adaptation criteria. In addition, it is contemplated that even the method of representing the data based on other information indicating these adaptation criteria indicates the same meaning as an example of the present invention.

It is also possible to present a method for defining new elements and attributes that can present and refer to adaptation criteria meant by the new attributes, and making reference to them. For example, a method is presented that is capable of providing an adaptation criteria list that describes adaptation criteria, depending on the inside or a specific location of the LASeR header, and making reference to the adaptation criteria list can be used as a method for defining and filtering new attributes.

Table 4 shows an example of a LASeR header that provides a list of adaptation criteria. As described above, reference can be made to one or more adaptation criteria in the list. Even though there is a modification or change in representation of theses attributes and fields, when they are used for performing filtering for adaptive data representation, it would fall within the scope of the present invention.

TABLE 4

```
<LASeRHeader ... adaptationConstraint="01 02">
    <AdaptationSceneInfo>
        <constraint   id="01"   adaptationType="0x01" adaptationTypeValue="..."/>
        <constraint   id="02"   adaptationType="0x02" adaptationTypeValue="..."/>
        ...
        <constraint id="..." adaptationType="..." adaptationTypeValue="..."/>
    </AdaptationSceneInfo>
</LASeRHeader>
```

Another embodiment of the present invention provides a method that performs filtering on "adaptive scene component" information when adaptation criteria are different in units of LASeR commands, i.e., performs filtering in units of commands.

Referring to Table 5 below, LASeR commands such as NewScene and Insert are used for scene composition. Table 5 shows content including 4 scene commands.

TABLE 5

```
<NewScene>
    <svg id="root" width="333" height="250">
        <g>...</g>
    </svg>
</NewScene>
<Insert ref="root">
    <g id="Dictionary" visibility="hidden"/>
</Insert>
<Insert ref="Dictionary" attributeName="children">
    <polyline id="Shape4" stroke="0.0 0.0 0.019607844"
        points="-166.5 359.9 984.6 356.65 983.65 358.5"/>
</Insert>
<Insert ref="Shape4" attributeName="points" value="0.65 8.5"
    index="0">
</Insert>
```

Tables 6A and 6B below show a method for defining adaptive scene component information as a new attribute of a LASeR command and representing it, in order to filter it on a command by command basis.

TABLE 6A

```
<NewScene>
    <svg id="root" width="333" height="250">
        <g>...</g>
    </svg>
</NewScene>
<Insert ref="root">
    <g id="Dictionary" visibility="hidden"/>
</Insert>
<Insert ref="Dictionary" attributeName="children"
        AdaptiveSceneIndicator="True"
        AdaptationType="0x01"
        AdaptationTypeValue="MEDIUM">
    <polyline id="Shape4" stroke="0.0 0.0 0.019607844"
        points="-166.5 359.9 984.6 356.65 983.65 358.5"/>
</Insert>
<Insert ref="Shape4"
        attributeName="points" value="0.65 8.5" index="0"
        AdaptiveSceneIndicator="True"
AdaptationType="0x01" AdaptationTypeValue="LARGE">
</Insert>
```

Referring to Table 6A, a scene of an Insert command for inserting a new scene composition element "polyline" into an element having "Dictionary" as an ID attribute indicates data for terminals whose display sizes are categorized as MEDIUM.

In addition, a scene of an "Insert" command for inserting a new attribute points into an element having "Shape4" as an ID attribute indicates data for terminals whose display size is categorized as LARGE.

A terminal, which has received data as shown in Table 6A, may perform a filtering process, including executing a specified command, decoding the data until it receives the next scene, composing a scene, or discarding the data without rendering, according to adaptation criteria, and its own characteristics and conditions associated with values thereof.

Table 6B below shows an example of a method for adding a new field onto a LASeR command and performing filtering or switching according to adaptation information on a command-by-command basis. The new field for command-by-command filtering or switching may be used as a group of one or more commands.

TABLE 6B

```
<NewScene>
    <svg id="root" width="333" height="250">
        <g>...</g>
    </svg>
</NewScene>
<Insert ref="root">
    <g id="Dictionary" visibility="hidden"/>
</Insert>
<Adaptation AdaptiveSceneIndicator="True"
        AdaptationType="0x01" AdaptationTypeValue="MEDIUM">
<Insert ref="Dictionary" attributeName="children">
    <polyline id="Shape4" stroke="0.0 0.0 0.019607844"
        points="-166.5 359.9 984.6 356.65 983.65 358.5"/>
</Insert>
</Adaptation>
<Adaptation AdaptiveSceneIndicator="True"
        AdaptationType="0x01" AdaptationTypeValue="LARGE">
<Insert ref="Shape4" attributeName="points" value="0.65 8.5"
index="0"/>
</Insert>
</Adaptation>
```

As in the above example, adaptation criteria of a LASeR data stream adaptable to performance of a terminal, and fields and attributes for indicating their associated values may change in their locations and presentations according to units of data providing Adaptation-related data, i.e., to target and scope of filtering.

For example, when the adaptation information is provided on a file-by-file basis, it may be located in a file header. When the adaptation information is provided on a scene command-by-scene command basis, it can be represented with an attribute in a LASeR command, can be represented by adding a field that can function as a new group node or a parental node and a header thereof, or can be represented with new elements in the scene composition elements or attributes for the scene composition elements.

Therefore, when a terminal, which has received adaptation criteria of a LASeR data stream and fields and attributes for indicating their associated values, receives data it cannot process, the terminal performs filtering including a discard process that includes discarding data related to the fields and attributes without decoding, or deleting already decoded data, if any, from a memory without rendering.

Next, as another exemplary embodiment of the present invention, a filtering or switching method will be described, with a set of data for scene description defined as a criterion for filtering. The set of data for scene description may be represented in scene segments or Access Units (AU). In the following description, it is assumed that a set of data for scene description or its header has adaptation information.

First, a description will be made of a method wherein when a set of data for describing a scene for a predetermined time is divided into several streams and then delivered, i.e., when a set of data for describing a scene for the same time is divided into several streams and then delivered, a terminal selects only the streams agreeable to its own performance and situations, and uses them as data for composing the scene.

The terminal receives data, checks header information in the received data, detects adaptation information from the header information, checks a terminal condition according thereto, and filters only the stream that includes a set of data suitable to its own performance and situations, thereby providing a service. As described above, a filtering operation such as discarding data may be performed without a decoding process or a scene composition process that should be carried out in the process of providing the service.

When a set of data for describing a scene for a predetermined time is composed of successive data and delivered in one stream, another method detects adaptation information by checking header information, checks a terminal status according thereto, and filters only the set of data suited to its own performance and situation, thereby providing a service. When the data set is composed of successive data, the scene composition time information of the information for representing a scene for a predetermined time may have the same value, and this information can also be used for filtering and switching. In addition to the above-described method, it is also possible to perform filtering by defining the set of data for describing a scene as criteria for filtering with use of the adaptation-related information described by the present invention.

TABLE 7

<SceneUnit>
... commands ...
</SceneUnit>

"SceneUnit" in Table 7 may include therein commands such as NewScene and Refresh, which are included in one access unit, and the "SceneUnit" may have the adaptation information defined by the present invention as attributes. As another use, a new command (e.g., Add, Delete . . . ) for Adaptation may be defined in SceneUnit at the same level as other commands. This new command includes scenes that are commands and have the same adaptation criteria. For example, it can be used as follows.

TABLE 8

<! --a AU start -- >
... commands ...
<SceneUnit adaptationConstraint= "...">
... commands ...
</SceneUnit>
<SceneUnit adaptationConstraint= "...">
... commands ...
</SceneUnit>
... commands ...
<! --a AU End -- >

In Table 8, an adaptationConstraint attribute includes AdaptationType, and AdaptationTypeValue information, or refers to the information. The AdaptationType and AdaptationTypeValue can provide various adaptation criteria in a list type. In this case, the terminal receives data, checks AdaptiveSceneIndicator, AdaptationType, and AdaptationTypeValue information of its command group, checks terminal status according thereto, and filters only the data suitable for its own performance and conditions, thereby providing a service.

As described above, a filtering and switching operation such as discarding data may be performed without a decoding process or a scene composition process that should be carried out in the process of providing the service.

In addition to the above-described method, it is also possible to perform filtering based on an AU, which is a minimum unit indicating the data that should be represented within a unit time with use of the adaptation information defined in the present invention.

Figure 3:
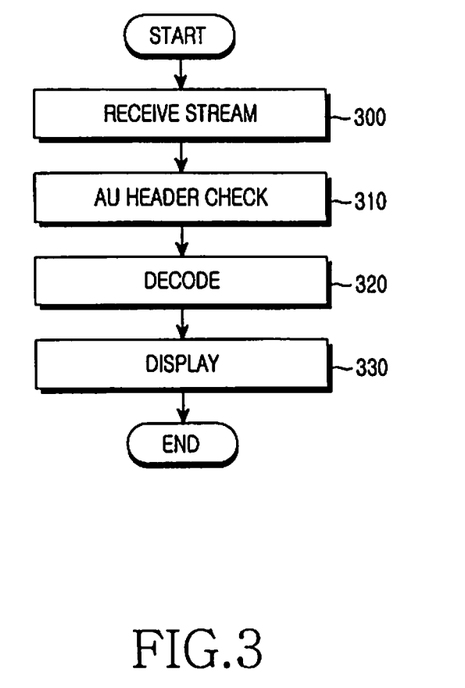
FIG. 3 illustrates an operation of a terminal for receiving a LASeR data stream, which is serviced by multiplexing data streams in a LASeR service according to an embodiment of the present invention.

FIG. 3 illustrates an operation of a terminal for receiving a LASeR stream, which is serviced by multiplexing several logical streams to one physical stream, according to an embodiment of the present invention.

Referring to FIG. 3, a terminal receives a LASeR stream in step 300, and checks each AU's header in the received stream in step 310. The terminal decodes data used to compose a scene in step 320, and displays the data at a scene composition time in step 330.

Figure 4:
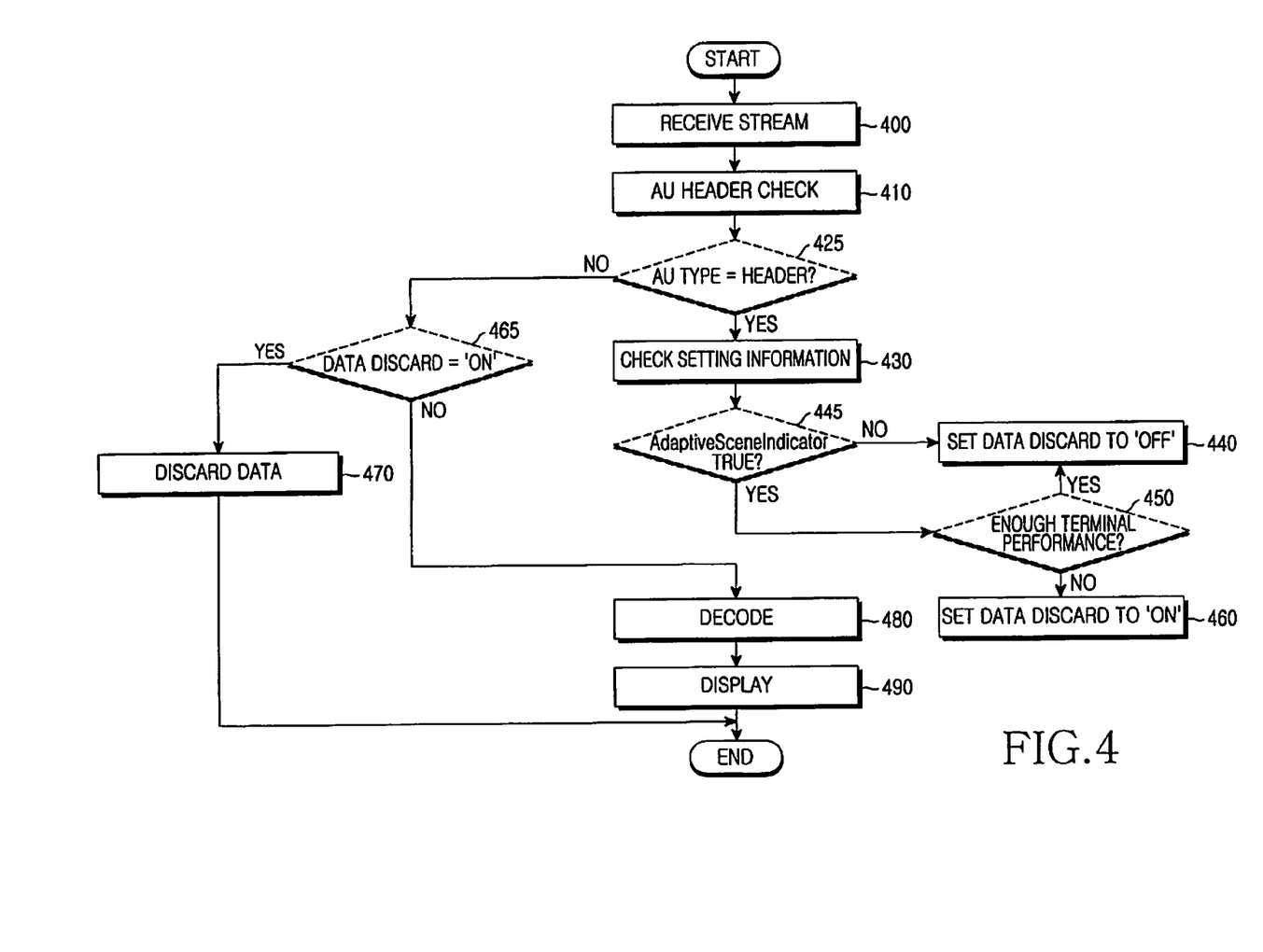
FIG. 4 illustrates an operation of a terminal for receiving a LASeR data stream according to an embodiment of the present invention.

FIG. 4 illustrates an operation of a terminal for receiving a LASeR service, which is serviced by multiplexing several logical streams to one physical stream, according to an embodiment of the present invention. The LASeR data stream may include the data stream that contains components associated with characteristics of each receiving terminal. In the case of a LASeR stream that is serviced by multiplexing several logical streams to one physical stream, an AU containing header information and an AU containing data constituting an actual scene are constructed individually.

Referring to FIG. 4, a terminal receives a LASeR stream in step 400, and checks an AU header in the received LASeR stream in step 410. In step 425, the terminal determines if the received AU contains header information. If the received AU contains header information, the terminal checks setting information for AU in step 430. The setting information includes header information of the LASeR stream.

The terminal determines a value of an "AdaptiveSceneIndicator" field in step 445. If a value of the "AdaptiveSceneIndicator" field is FALSE, the terminal sets, in step 440, setting information for Data Discard to OFF so as not to discard the LASeR stream, and then decodes an AU that contains actual data of the received header information, i.e., data used to compose an actual scene, which will be received later.

If a value of the "AdaptiveSceneIndicator" field is TRUE, the terminal checks its performance in step 450. If its performance is not sufficient to service an "adaptive scene component", the terminal sets, in step 460, setting information for Data Discard to ON to discard actual data of the received header information, which is received later, without any further processing a received AU that contains data used for composing an actual scene, i.e., without decoding the data and composing or rendering the scene in the memory. However, if its performance is sufficient to service the adaptive scene component, the terminal does not discard the LASeR stream in step 440.

However, if the received AU contains no header information in step 425, the terminal determines in step 465 whether to discard the AU containing data used to compose an actual scene regarding the AU containing header information described in FIG. 4, until a new AU containing header information is received later.

If the terminal determines not to discard the received AU in step 465, the terminal checks setting information. Based on the setting information, the terminal decodes the received data in step 480, and displays the decoded data on the screen in step 490. However, if the terminal determines to discard the received data in step 465, the terminal discards the received LASeR stream without decoding the data and composing or rendering it in the memory in step 470.

In the above described embodiment, except for receiving a stream (step 400), checking an AU's header (step 410), checking setting information (step 430), decoding an AU that contains data used to compose an actual scene regarding the AU containing header information the terminal receives later (step 480), based on a value of the 'AdaptiveSceneIndicator' field (step 445), and displaying the decoded data on the screen (step 490), or discarding the data without the decoding process and all of its succeeding processes, any additional processes can be changed in the sequence or omitted according to the type and design of the specific terminals.

If the same service as of the present invention can be provided using the "AdaptiveSceneIndicator" field, and the fields and attributes newly defined in the present invention, it would be apparent to those skilled in the art that various changes and modifications of the embodiments described herein can be made without departing from the scope and spirit of the invention.

When LASeR data is provided by multiplexing several logical streams to one physical stream as described in the second exemplary embodiment, a LASeR header can be carried on an AU of a SAF provided to transmit data of the header type. The "AdaptiveSceneIndicator" field, and the fields and attributes newly defined in the present invention can be represented as shown in Table 9, and can also added in saf: sceneHeader.

TABLE 9

<saf:sceneHeader>
<LASeRHeader
    AdaptiveSceneIndicator="True"
    AdaptiveType="DisplaySize"
    AdaptiveValue="5(inch)"/>
</saf:sceneHeader>

Table 10 below shows, as another embodiment of the present invention, a method for allocating 1 bit of a presenceOfDTS field for AdaptiveSceneFlag described herein, as the presenceOfDTS field in a Packet Header of the SAF is presently preset to 0 and unused. In this embodiment, a terminal, which has received a SAF packet with "AdaptiveSceneFlag"=True in Table 10, may recognize that the data stream includes data for an adaptive data service, which contains elements related to characteristics of each terminal, by checking the packet header before checking the AU.

TABLE 10 class SAF_PacketHeader {
    bit(1) randomAccessPointFlag;
    bit(15) sequenceNumber;
    const bit(1) AdaptiveSceneFlag;
    const bit(1) presenceOfCTS = 1;
    bit(30) compositionTimeStamp;
    uint(16) accessUnitLength;
}

As another embodiment of the present invention, SAF_AdaptiveScene_Unit is defined as a new AU type of the SAF to indicate adaptation criteria and their values in a LASeR data stream adaptable to characteristics of a terminal. SAF_Adaptive_Unit can indicate adaptation criteria and their values of a SAF AU that will be received later.

Table 11 below specifies SAF_AdaptiveScene_Unit in a new SAF type. Stop_AdaptiveScene_Unit indicates that a SAF AU is no longer received that contains data associated with adaptation criteria and their values in the previously received SAF_AdaptiveScene_Unit.

TABLE 11

| Value | Type of access unit payload | Data in payload |
| --- | --- | --- |
| 0x00 | Reserved | — |
| 0x01 | TransientStreamHeader | A SimpleDecoderConfigDescriptor |
| 0x02 | NonTransientStreamHeader | A SimpleDecoderConfigDescriptor |
| 0x03 | EndofStream | (no data) |
| 0x04 | AccessUnit | An Access Unit |
| 0x05 | EndOfSAFSession | (no data) |
| 0x06 | CacheUnit | A cache object |
| 0x07 | RemoteStreamHeader | An url and a SimpleDecoderConfigDescriptor |
| 0x08 | GroupDescriptor | — |
| 0x09 | FirstFragmentUnit | The first Fragment of an Access Unit |
| 0x0A | FragmentUnit | A Fragment of an Access Unit (not the first fragment) |
| 0x0B | SAFConfiguration | A safConfiguration object |
| 0x0C | StopCache | — |
| 0x0D | SAF_AdaptiveScene_Unit | — |
| 0x0E | Stop_AdaptiveScene_Unit | — |
| 0x0E~0x0F | Reserved | — |

The SAF_AdaptiveScene_Unit may include the above-described adaptation information as its field. In this case, adaptiveSceneIndicatorFlag may be added, and this indicates that a SAF AU data stream that can be represented in the field and will be received later, is an Adaptive scene component.

The "adaptiveSceneIndicatorFlag" may be unused when the presence itself of "SAF_AdaptiveScene_Unit" indicates that a value of this field is "SAF_AdaptiveScene_Unit"=True. An AdaptationType field indicates adaptation criteria of a data stream. Attribute values of "AdaptationType" can be represented in various ways according to types of the attribute values, and the number of allocated bits is subject to change according to the way of representation.

In addition, when the method of representing "AdaptationType" by making reference is used among various methods of representing "AdaptationType", a new field for a url type, urlLengh and the like may be newly added.

"AdaptationTypeValue" is a field representing an adaptation criteria value of the data stream. When there are two or more adaptation criteria that are adaptable to a data stream, a numOfAdaptationType field or the like may be added. A field for providing length information of a data node for "AdaptationType" may be added according to information representation methods.

As further another embodiment of the present invention, SAF AU, AdaptiveSceneAU, AdaptiveSceneCacheUnit, AdaptiveSceneFFU, and AdaptiveSceneFU, all of which can contain a data stream adaptable to characteristics of a terminal, are defined in a new SAF AU type.

"AdaptiveSceneAU" represents a type of an AU that can contain a data stream adaptable to characteristics of a terminal, and "AdaptiveSceneCacheUnit" represents a type of an AU that can contain cache data adaptable to characteristics of a terminal. When a size of the data stream adaptable to characteristics of a terminal is greater than a size of the AU, data may be provided after it is fragmented. The first AU of the fragmented data may be contained in "AdaptiveSceneFFU", and the remaining data segment may be contained in "AdaptiveSceneFU".

Table 12 below specifies "SAF_AdaptiveScene_Unit" in a new SAF type.

TABLE 12

| Value | Type of access unit payload | Data in payload |
|---|---|---|
| 0x00 | Reserved | — |
| 0x01 | TransientStreamHeader | A SimpleDecoderConfigDescriptor |
| 0x02 | NonTransientStreamHeader | A SimpleDecoderConfigDescriptor |
| 0x03 | EndofStream | (no data) |
| 0x04 | AccessUnit | An Access Unit |
| 0x05 | EndOfSAFSession | (no data) |
| 0x06 | CacheUnit | A cache object |
| 0x07 | RemoteStreamHeader | An url and a SimpleDecoderConfigDescriptor |
| 0x08 | GroupDescriptor | — |
| 0x09 | FirstFragmentUnit | The first Fragment of an Access Unit |
| 0x0A | FragmentUnit | A Fragment of an Access Unit (not the first fragment) |
| 0x0B | SAFConfiguration | A safConfiguration object |
| 0x0C | StopCache | — |
| 0x0D | AdaptiveSceneAU | An Access Unit |
| 0x0E | AdaptiveSceneCacheUnit | A cache object |
| 0x0F | AdaptiveSceneFFU | The first Fragment of an Access Unit |
| 0x10 | AdaptiveSceneFU | A Fragment of an Access Unit (not the first fragment) |
| 0x11~ | Reserved | — |

A method for representing adaptation criteria and their values for the data contained in even "AdaptiveSceneCacheUnit", "AdaptiveSceneFFU", "AdaptiveSceneFU" as well as "AdaptiveSceneAU" is equal to the method described above.

In addition, although a Unit type of a new SAF is not defined, fields indicating adaptation criteria such as Adaptive Scene Indicator, AdaptiveType and AdaptiveValue can be added to each Unit of the existing SAF, including Header Unit types (0x01, 0x02, 0x07) and AU Unit types (0x04, 0x06) of the SAF. Further, information about a size of data allocated in defining fields of the adaptation criteria may be differently allocated or represented according to a data type of the information.

Figure 5:
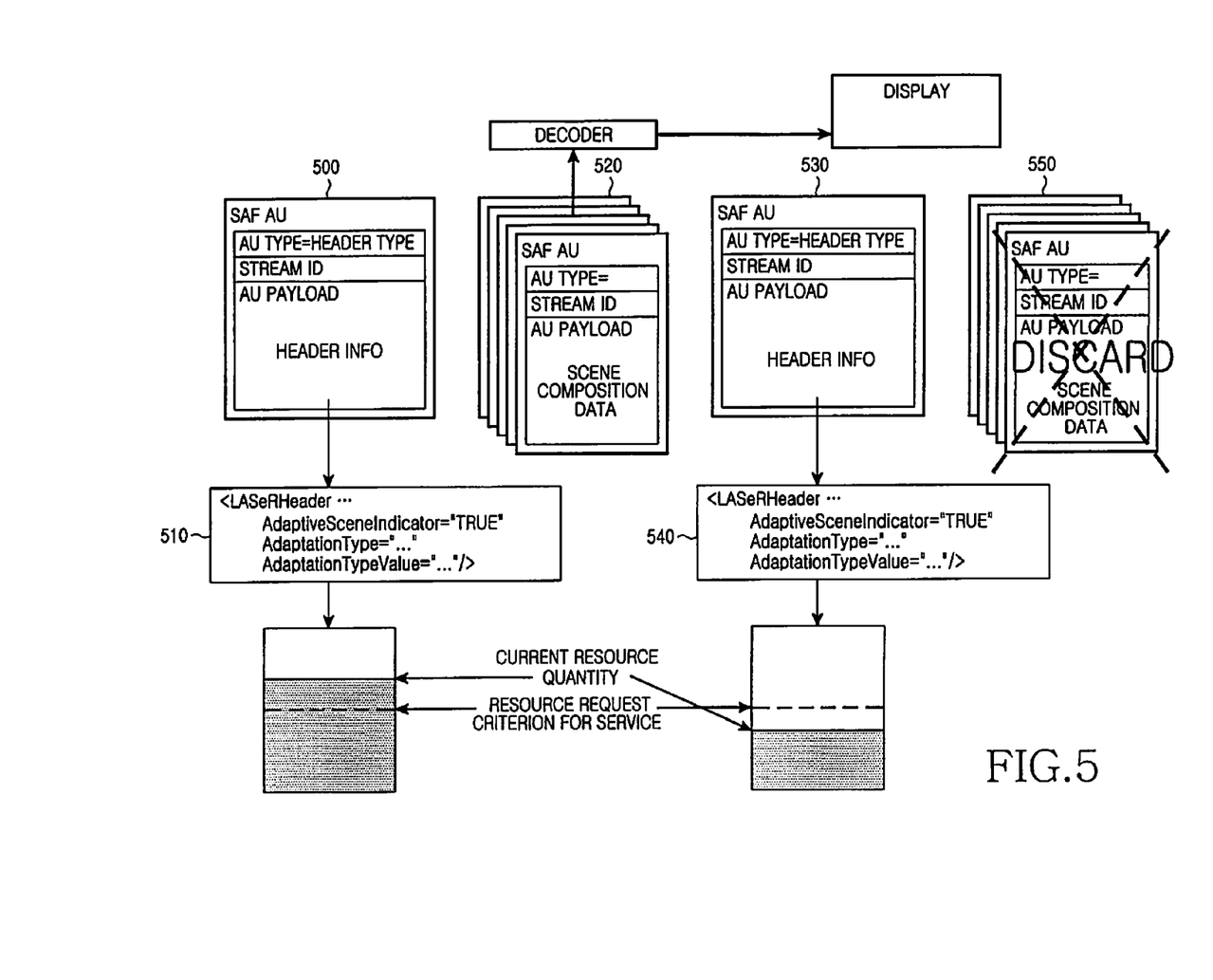
FIG. 5 illustrates an operation of servicing LASeR contents according to an embodiment of the present invention.

FIG. 5 illustrates an example of servicing LASeR contents according to an embodiment of the present invention.

Referring to FIG. 5, AU 500 includes a header. AUs 500 and 530 can be fields and AUs for indicating adaptation criteria and their values of a data stream, including not only the header type but also "SAF_AdaptiveScene_Unit", according to the embodiments of the present invention. When "AdaptiveSceneIndicator" is set to TRUE in a header 510, a terminal checks its own current status. Here, the terminal checks the available resources, or considers event states and such conditions as CPU processing capability, memory status, and battery status. If the current status of the terminal is sufficient to process the adaptive scene component, the terminal decodes and displays data 520, which is received later.

In accordance with an embodiment of the present invention, a range of the data 520 can be available until the terminal receives data or header having a field regarding adaptation criteria and their values of the next adaptation data. When "Stop_AdaptiveScene_Unit" is received, which signals that adaptation criteria associated with the data and their values are no longer available, it may indicate that the data 520 has been completely received.

Thereafter, a terminal, which has received an AU that includes the header 530, determines whether "AdaptiveSceneIndicator" is TRUE by checking header information 540. If the terminal is not enough to process the adaptive scene component, the terminal discards all of AUs 550 containing actual data of scene composition, which is received later, without decoding.

In accordance with the embodiments of the present invention, even for the data that has already undergone a decoding process, the terminal performs data discarding, including deleting the data from the memory according to a filtering mechanism corresponding to the adaptation criteria and their values described in the present invention.

Even when performance of a terminal changes while LASeR contents are serviced according to the method provided in an exemplary embodiment of the present invention, it is possible to more flexibly compose a scene taking into account specific conditions or performance of the terminal. When the elements or attributes defined in the embodiment of the present invention have the same meanings, different names or types of the elements and attributes or attribute values can be used. In addition, the fields or attributes described in the embodiments of the present invention may be used independently or collectively.

Figure 6:
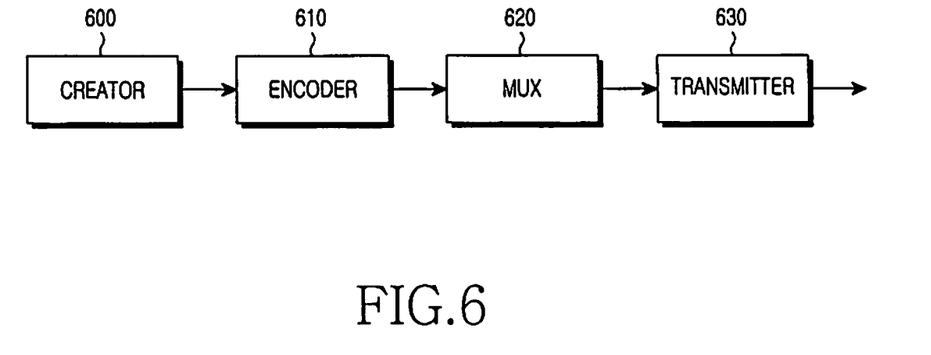
FIG. 6 is a block diagram illustrating a structure of a transmitter according to an embodiment of the present invention.

FIG. 6 is a block diagram illustrating a structure of a transmitter according to an exemplary embodiment of the present invention.

Referring to FIG. 6, a creator 600 may create scene composition elements including scene composition elements and attributes that can indicate or identify specific conditions or characteristics and performance of a terminal, which have been described in the embodiments of the present invention above. In making scene composition elements, the creator 600 may also create detail scene contents of an operation corresponding to use of events or occurrence of events. The creator 600 delivers the created LASeR contents to an encoder 610. The encoder 610 encodes the LASeR contents and delivers the encoded LASeR contents to a multiplexer 620. The multiplexer 620 multiplexes the encoded LASeR contents with several logical streams, outputting one physical stream. A transmitter 630 transmits the multiplexed stream to a receiver.

The encoded LASeR contents may be transmitted without the multiplexing process. This can be omitted as in the one of the above-described embodiments of the present invention.

Figure 7:
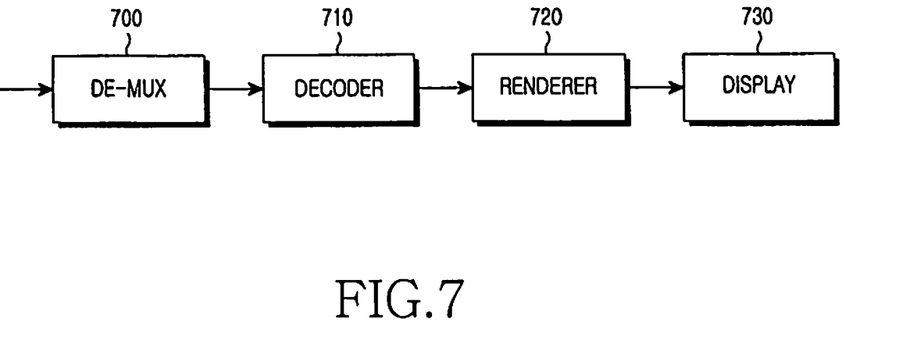
FIG. 7 is a block diagram illustrating a structure of a receiver according to an embodiment of the present invention.

FIG. 7 is a block diagram illustrating a structure of a receiver according to an embodiment of the present invention.

Referring to FIG. 7, a demultiplexer 700 separates or demultiplexes a received stream into logical streams. For a stream that did not undergo multiplexing, obviously, the demultiplexing process can be omitted.

A decoder 710 decodes the demultiplexed stream and delivers the decoded stream to a renderer 720. Particularly, in accordance with the present invention, the decoder 710 decodes the received stream to check a header of the stream.

The renderer 720 receives the decoded data, and renders the scene based on scene composition elements including scene composition elements and attributes that can indicate or identify specific conditions or characteristics and performance of a terminal according to an exemplary embodiment of the present invention. That is, the renderer 720 determines whether to adaptively compose a scene using the scene composition elements of the received stream according to adaptation information of the header checked by the decoder 710. A display 730 displays each scene on the screen of the terminal.

A method of defining information depending on the elements and attributes newly defined in the present invention is subject to change. In accordance with each data definition format, the newly defined element and attribute information can be composed of header information, including information for initial scene composition, and signaling information for scene update, scene update data groups, scene segments, and access units, or can be composed of access unit or header information which is separate from the actual scene information for scene composition for signaling. When formed in a data format for signaling, the newly defined element and attribute information can be composed of fields for representing the information.

The information used as values of the attributes newly defined in the present invention may be used referring to other data, files, applications, services, etc., inside/outside the LASeR contents. In this case, attributes can be defined in the LASeR contents to refer to only the attribute values, and even the attributes defined as other data, files, programs, services, etc., can also be referred to using elements and attributes having a reference function. Even when the attributes and attribute values are referred to using the elements and attributes having the reference function, if they are used for the same purpose as the function of attributes described in the present invention, it would fall within the scope of the present invention.

As is apparent from the foregoing description, the present invention can reduce a burden of supporting a LASeR service at a terminal having insufficient available resources, and provide richer LASeR service at a terminal having sufficient available resources, taking into account specific conditions or attributes and specific events associated with performance of the terminal, such as display size, CPU processing capability, memory, battery status, input/output device, etc.

Exemplary embodiments of the present invention can also be embodied as computer-readable codes on a computer-readable recording medium. The computer-readable recording medium is any data storage device that can store data, which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of operating a terminal based on a Lightweight Application Scene Representation (LASeR) engine, the method, comprising:
checking adaptation information in a header of a received LASeR stream comprising scene composition elements for scene description;
adaptively composing a scene using scene composition elements of the received LASeR stream, according to the adaptation information in the header; and
displaying the adaptively composed scene,
wherein the adaptation information includes an adaptation type and an adaptation type value,
wherein the adaptation type indicates adaptation criteria of the LASeR stream and the adaptation type value indicates a value of the adaptation criteria of the LASeR stream,
wherein the adaptation criteria includes at least one of a display size, a computational capacity, a power consumption capacity, memory information, and an input/output capacity of the terminal required to process the LASeR stream, and
wherein adaptively composing a scene includes checking a terminal status according to the adaptation type and adaptation type value and discarding scene composition elements if the terminal status is unsuitable.

2. The method of claim 1, wherein the adaptation information is included in attribute of adaptation constraints.

3. The method of claim 1, wherein the adaptation information is set on a command-by-command basis, such that each command relates to insertion of a scene composition element.

4. The method of claim 1, wherein the adaptation information is set on a scene unit-by-scene unit basis, the scene unit being a set of at least one stream and used to compose the scene within a predetermined time.

5. The method of claim 1, wherein the adaptation information is set on an access unit-by-access unit basis, the access unit being a minimum stream unit and used to compose the scene within a time unit.

6. The method of claim 1, wherein the adaptation information is set in units of access units of a Simple Aggregation Format (SAF), which is an aggregation of an audio stream and a video stream.

7. The method of claim 1, wherein the adaptation information is set on a fragment unit-by-fragment unit basis, the fragment unit being a fragment of an access unit and used to compose the scene within a time unit.

8. The method of claim 1, wherein the adaptation type further includes at least one of information for a graphic element, information for a font element, information for a text element, and information for image or video data, each of which is used to adaptively compose the scene.

9. The method of claim 1, wherein the adaptation type value indicates values of adaptation criteria of the received stream adaptable to terminal characteristics.

10. A terminal for operating based on a Lightweight Application Scene Representation (LASeR) engine, the terminal, comprising:
a decoder for decoding a received LASeR stream comprising scene composition elements for scene description, the decoder being configured to check adaptation information in a header of the received LASeR stream;
a renderer for adaptively composing a scene using the scene composition elements of the received LASeR stream, according to the adaptation information in the header checked by the decoder; and
a display for displaying the adaptively composed scene,
wherein the adaptation information includes an adaptation type and an adaptation type value,
wherein the adaptation type indicates adaptation criteria of the LASeR stream and the adaptation type value indicates a value of the adaptation criteria of the LASeR stream, wherein the adaptation criteria includes at least one of a display size, a computational capacity, a power consumption capacity, memory information, and an input/output capacity of the terminal required to process the LASeR stream, and wherein adaptively composing a scene includes checking a terminal status according to the adaptation type and adaptation type value and discarding scene composition elements if the terminal status is unsuitable.

11. The terminal of claim 10, wherein the renderer checks the adaptation information that is set on a command-by-command basis, such that each command relates to insertion of a scene composition element.

12. The terminal of claim 10, wherein the renderer checks the adaptation information that is set on a scene unit-by-scene unit basis, the scene unit being a set of at least one stream and used to compose the scene within a predetermined time.

13. The terminal of claim 10, wherein the renderer checks the adaptation information that is set on an access unit-by-access unit basis, the access unit being a minimum stream unit and used to compose the scene within a time unit.

14. The terminal of claim 10, wherein the renderer checks the adaptation information that is set in units of access units of a Simple Aggregation Format (SAF), which is an aggregation of an audio stream and a video stream.

15. The user interface apparatus terminal of claim 10, wherein the renderer checks the adaptation information that is set on a fragment unit-by-fragment unit basis, the fragment unit being a fragment of an access unit and used to compose the scene within a time unit.

16. The terminal of claim 10, wherein the adaptation type comprises at least one of:
   a display size;
   a computational capacity;
   a power consumption capacity;
   a memory information; and
   an input/output capacity of device required to process the received stream.

17. The terminal of claim 16, wherein the adaptation type further comprises at least one of:
   information for a graphic element;
   information for a font element;
   information for a text element; and
   information for image or video data,
   each of which are used to adaptively compose the scene.

18. The terminal of claim 10, wherein the adaptation information is included in an adaptation constraint attribute.

19. The terminal of claim 10, wherein the adaptation type value indicates values of adaptation criteria of the received stream adaptable to terminal characteristics.

* * * * *